(12) United States Patent
Miyata et al.

(10) Patent No.: US 7,375,510 B2
(45) Date of Patent: May 20, 2008

(54) ROTATIONAL POSITION SENSOR AND ELECTRONICALLY CONTROLLED THROTTLE DEVICE AND INTERNAL COMBUSTION ENGINE

(75) Inventors: Kenji Miyata, Chiyoda-ku (JP); Masanori Kubota, Hitachinaka (JP); Kenichi Katagishi, Hitachinaka (JP); Kenji Ono, Chiyoda-ku (JP); Masahiko Soshino, Chiyoda-ku (JP); Mitsuru Sudo, Hitachinaka (JP)

(73) Assignees: Hitachi, Ltd., Tokyo (JP); Hitachi Car Engineering Co., Ltd., Hitachinaka-shi (JP)

( * ) Notice: Subject to any disclaimer, the term of this patent is extended or adjusted under 35 U.S.C. 154(b) by 267 days.

(21) Appl. No.: 10/920,194

(22) Filed: Aug. 18, 2004

(65) Prior Publication Data

US 2005/0104581 A1 May 19, 2005

(30) Foreign Application Priority Data

Nov. 18, 2003 (JP) ............................. 2003-387717

(51) Int. Cl.
*G01B 7/30* (2006.01)
(52) U.S. Cl. ............................... 324/207.25; 324/207.2
(58) Field of Classification Search ........... 324/207.25, 324/207.2, 207.21, 207.22
See application file for complete search history.

(56) References Cited

U.S. PATENT DOCUMENTS

| 5,444,369 | A | 8/1995 | Luetzow |
| 5,528,139 | A | 6/1996 | Oudet et al. |
| 5,789,917 | A | 8/1998 | Oudet et al. |
| 6,137,288 | A | 10/2000 | Luetzow |
| 6,483,296 | B1 | 11/2002 | Hamaoka |
| 2002/0113681 | A1 | 8/2002 | Byram |
| 2002/0130656 | A1* | 9/2002 | Hagio et al. ............. 324/207.2 |
| 2005/0127900 | A1* | 6/2005 | Johnson et al. .......... 324/207.2 |

FOREIGN PATENT DOCUMENTS

| DE | 10055288 | | 5/2001 |
| JP | B2-2920179 | | 4/1999 |
| JP | 11183114 A | * | 7/1999 |
| JP | A-2000-28314 | | 1/2000 |
| JP | A-2002-206913 | | 7/2002 |

* cited by examiner

*Primary Examiner*—Patrick Assouad
*Assistant Examiner*—David M. Schindler
(74) *Attorney, Agent, or Firm*—Crowell & Moring LLP

(57) ABSTRACT

A rotational position sensor having a compact and simple structure, in which a magnetic surface can be formed to have a more accurate shape, and an electronically controlled throttle device for an internal combustion engine, which employs the rotational position sensor. The rotational position sensor comprises a pair of substantially half disk-shaped magnetic cores disposed in an opposed relation to each other with a magnetic sensitive device interposed therebetween, a pair of substantially arc-shaped magnetic cores disposed in an opposed relation to each other along outer peripheries of the half disk-shaped magnetic cores, and a permanent magnet fixed in contact with at least one of the arc-shaped magnetic cores. Magnetic flux generating from the permanent magnet flows successively through one of the arc-shaped magnetic cores, the half disk-shaped magnetic cores, and the other of the arc-shaped magnetic cores, followed by returning to the permanent magnet. The half disk-shaped magnetic cores or the permanent magnet is rotatable, and the magnetic sensitive device detects an amount of the magnetic flux varying with rotation of the half disk-shaped magnetic cores or the permanent magnet.

13 Claims, 12 Drawing Sheets

ROTATIONAL POSITION SENSOR AND ELECTRONICALLY CONTROLLED THROTTLE DEVICE AND INTERNAL COMBUSTION ENGINE

BACKGROUND OF THE INVENTION

1. Field of the Invention

The present invention relates to a novel rotational position sensor for detecting a rotational angle of a rotary shaft of, e.g., a throttle valve for an internal combustion engine, and also relates to an electronically controlled throttle device for an internal combustion engine, which employs the rotational position sensor.

2. Description of the Related Art

There are hitherto known rotational position sensors each having a characteristic that the amount of change in a signal output is proportional to the amount of change in a rotational angle, as disclosed in Patent References 1 to 3. Patent Reference 1 (Japanese Patent No. 2920179) discloses a magnetic position sensor comprising a rotor core having an annular magnet fixed on the inner peripheral side of an annular yoke, and two half disk-shaped stator cores arranged on the inner peripheral side of the annular magnet with a Hall device disposed between the two stator cores. Patent Reference 2 (JP-A-2000-28314) discloses a magnetic rotational position sensor comprising a rotor having an half disk-shaped magnet formed integrally with an inner periphery of a loop-like pole piece, and a magnetic flux sensor arranged on the inner peripheral side of the loop-like pole piece. Patent Reference 3 (JP-A-2002-206913) discloses a non-contact rotational position sensor comprising a rotor having an annular magnet, and a stator having two magnetic plates arranged above and below the rotor with a Hall device disposed between the two magnetic plates.

SUMMARY OF THE INVENTION

In the known rotational position sensor disclosed in Patent Reference 1, a magnetic short must be prevented in the inner stator cores including a magnetic sensitive device in order to ensure that the amount of change in a signal output is proportional to the amount of change in a rotational angle. For that reason, two holes require to be formed in the inner stator cores. Also, from the viewpoint of improving linearity in both the amount of change in the signal output and the amount of change in the rotational angle, it is not appropriate for the outer rotor core to have a perfectly circular shape, and the outer rotor core is required to have a shape near an ellipse. Further, Patent Reference 1 requires two magnets because it utilizes a magnetic field distribution of magnetic repulsion type.

In the known rotational position sensor disclosed in Patent Reference 2, magnetic flux generating from a flat surface of the half disk-shaped magnet enters an inner peripheral surface of the loop-like pole piece, and therefore the flat surface must have an accurate shape. However, because the flat surface of the half disk-shaped magnet is formed by plastic working, it is difficult to form the flat surface having an accurate shape. Further, in the known sensor disclosed in Patent Reference 3, magnetic flux generating from the annular magnet enters flat surfaces of the two magnetic plates, and therefore each of those flat surfaces must have an accurate shape. However, because those flat surfaces are formed by plastic working, it is difficult to form those flat surfaces each having an accurate shape.

It is an object of the present invention to provide a rotational position sensor having a compact and simple structure, in which a magnetic surface can be formed to have a more accurate shape, and an electronically controlled throttle device for an internal combustion engine, which employs the rotational position sensor.

According to the present invention, at least one magnetic sensitive device is disposed between a pair of substantially half disk-shaped magnetic cores to form a stator having a cylindrical external shape. A pair of substantially arc-shaped magnetic cores are disposed around the stator with a certain gap left therebetween. At least one permanent magnet is positioned adjacent to bottom surfaces of the arc-shaped magnetic cores and is fixed to a magnetic plate. The two arc-shaped magnetic cores, the permanent magnet, and the magnetic plate constitute a rotor of a rotatable integral structure. By fixing the rotor to a shaft of a target to be measured, a rotational angle of the shaft can be measured in a non-contact manner.

More specifically, the present invention provides a rotational position sensor comprising a pair of substantially half disk-shaped magnetic cores disposed in an opposed relation to each other with a magnetic sensitive device interposed therebetween; a pair of substantially arc-shaped magnetic cores disposed in an opposed relation to each other along outer peripheries of the half disk-shaped magnetic cores; and a permanent magnet fixed in contact with at least one of the arc-shaped magnetic cores, wherein magnetic flux generating from the permanent magnet flows successively through one of the arc-shaped magnetic cores, the half disk-shaped magnetic cores, and the other of the arc-shaped magnetic cores, followed by returning to the permanent magnet, the half disk-shaped magnetic cores or the permanent magnet is rotatable, and the magnetic sensitive device detects an amount of the magnetic flux varying with rotation of the half disk-shaped magnetic cores or the permanent magnet.

Also, the present invention provides a rotational position sensor comprising a pair of substantially half disk-shaped magnetic cores disposed in an opposed relation to each other with a magnetic sensitive device interposed therebetween; a pair of substantially arc-shaped magnetic cores rotatably disposed in an opposed relation to each other along semicircular outer peripheries of the half disk-shaped magnetic cores; a permanent magnet fixed in contact with at least one of the arc-shaped magnetic cores; and a magnetic plate joined to the permanent magnet, wherein the permanent magnet is magnetized substantially in the axial direction of a rotary shaft, the half disk-shaped magnetic cores or the permanent magnet is rotatable, and the magnetic sensitive device detects an amount of the magnetic flux varying with rotation of the half disk-shaped magnetic cores or the permanent magnet.

In the present invention, preferably, the permanent magnet comprises two independent magnets that are disposed respectively in contact with the arc-shaped magnetic cores and are magnetized in opposed directions to each other. Alternatively, the permanent magnet is a ring-shaped magnet having areas held respectively in contact with the arc-shaped magnetic cores and magnetized in opposed directions to each other. Alternatively, the permanent magnet is disposed in contact with at least one of the arc-shaped magnetic cores. Further, the permanent magnet preferably has a radial width equal to that of the arc-shaped magnetic cores.

Moreover, the present invention provides a rotational position sensor comprising a pair of substantially half disk-shaped magnetic cores disposed in an opposed relation to each other with a magnetic sensitive device interposed therebetween; a pair of substantially arc-shaped magnetic cores rotatably disposed in an opposed relation to each other along semicircular outer peripheries of the half disk-shaped magnetic cores; a permanent magnet fixed in contact with the arc-shaped magnetic cores; and a non-magnetic plate for fixedly holding the arc-shaped magnetic cores and the permanent magnet, wherein the permanent magnet is magnetized substantially in a direction perpendicular to contact surfaces of the arc-shaped magnetic cores, the half disk-shaped magnetic cores or the permanent magnet is rotatable, and the magnetic sensitive device detects an amount of the magnetic flux varying with rotation of the half disk-shaped magnetic cores or the permanent magnet.

In the present invention, preferably, the permanent magnet is disposed in contact with respective extensions of the arc-shaped magnetic cores, the extensions being disposed on the inner peripheral side of the half disk-shaped magnetic cores. As an alternative, the permanent magnet is disposed in contact with respective extensions of the arc-shaped magnetic cores, the extensions being disposed around the half disk-shaped magnetic cores in a symmetrical relation. Alternatively, the permanent magnet is disposed in contact with each pair of respective extensions of the arc-shaped magnetic cores, the extensions being disposed around the half disk-shaped magnetic cores in a symmetrical relation on both opposite sides of the half disk-shaped magnetic cores. Further, the permanent magnet and the arc-shaped magnetic cores are preferably integrally joined to each other by a non-magnetic material.

In the present invention, preferably, the sensor has two magnetic sensitive devices disposed in a cylindrical magnetic plate in a side-by-side or stacked arrangement. Also, preferably, the magnetic sensitive device is a Hall device or a Hall IC. Signal outputs from the two magnetic sensitive devices may be in phase or in opposite phase. Preferably, a stator including the half disk-shaped magnetic cores and the magnetic sensitive device is resin-molded as an integral unit.

In addition, the present invention provides a throttle valve assembly, i.e., an electronically controlled throttle device for an internal combustion engine, comprising a main body having an air intake port; a rotary shaft disposed in the air intake port of the main body; a throttle valve fixed to the rotary shaft and adjusting an intake amount of air taken into the air intake port; and the above-mentioned rotational position sensor for detecting a rotational angle of the rotary shaft.

Thus, the present invention is able to provide a rotational position sensor having a simple structure and capable of easily realizing a size reduction, in which a magnetic surface can be formed to have a more accurate shape, thereby enabling the rotational position of a rotating object to be detected with high sensitivity and high accuracy within ±0.5% in a non-contact manner, and also to provide an electronically controlled throttle device for an internal combustion engine, which employs the rotational position sensor.

DESCRIPTION OF THE PREFERRED EMBODIMENTS

The best mode for carrying out the present invention will be described in detail below in connection with practical embodiments, but the present invention is not limited to the following embodiments.

First Embodiment

Figure 1A:
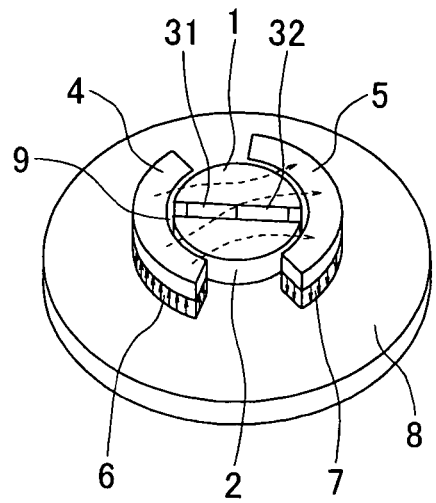
FIG. 1(a) is a perspective view of a rotational position sensor according to a first embodiment of the present invention.
Figure 1B:
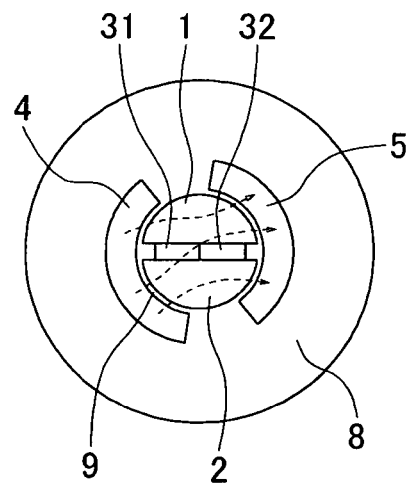
FIG. 1(b) is a top view thereof.

FIG. 1(a) is a perspective view of a non-contact rotational position sensor according to a first embodiment of the present invention, and FIG. 1(b) is a top view of the sensor shown in FIG. 1(a). In this embodiment, as shown in FIGS.

1(a) and 1(b), two Hall IC's 31, 32 serving as magnetic sensitive devices are disposed side by side along a gap between a pair of substantially half disk-shaped magnetic cores 1 and 2. Substantially arc-shaped magnetic cores 4, 5 are disposed around the substantially half disk-shaped magnetic cores 1, 2, substantially arc-shaped permanent magnets 6, 7 are joined to respective bottom surfaces of the substantially arc-shaped magnetic cores 4, 5, and a magnetic plate 8 is joined to both bottom surfaces of the substantially arc-shaped permanent magnets 6, 7, whereby a rotor is constituted. The rotor is coupled to a rotary shaft of a target device. The substantially half disk-shaped magnetic cores 1, 2 and the Hall IC's 31, 32 constitute a stator. Upper surfaces, as viewed in FIG. 1(a), of those components constituting the stator are fixed to an upper cover of a device body. Spaces between the substantially arc-shaped magnetic cores 4, 5 and the substantially half disk-shaped magnetic cores 1, 2 form air gaps 9. The substantially arc-shaped magnetic cores 4, 5, the permanent magnets 6, 7, and the magnetic plate 8 are rotated as an integral unit. Note that, although the sensor operates with either one of the Hall IC's 31, 32, two Hall IC's are disposed in this embodiment in consideration of mutual backup in the event of a failure or check operation in failure diagnosis.

The principle of the rotational position sensor of the present invention will be described below in connection with flows of magnetic flux in a magnet structure of this embodiment. As indicated by dotted arrows in FIG. 1(a), the substantially arc-shaped permanent magnets 6, 7 are magnetized generally in the axial direction of the rotary shaft and their magnetization directions are opposed to each other. In that condition, magnetic flux generally flows as indicated by dotted arrows in FIGS. 1(a) to 1(c). More specifically, the magnetic flux generating from the substantially arc-shaped permanent magnet 6 passes an arc-shaped surface of the substantially arc-shaped magnetic core 4 and then traverses the air gap 9, followed by entering, as distributed flows, the substantially half disk-shaped magnetic cores 1, 2. Parts of the distributed flows of the magnetic flux join with each other after passing the Hall IC's 31, 32. Then, the magnetic flux traverses the air gap 9 again and passes successively an arc-shaped surface of the substantially arc-shaped magnetic core 5, the substantially arc-shaped permanent magnet 7, and the magnetic plate 8 in this order, followed by returning to the substantially arc-shaped permanent magnet 6. Also, the magnetic flux generating from the substantially arc-shaped permanent magnet 7 forms a similar magnetic path.

Figure 1C:
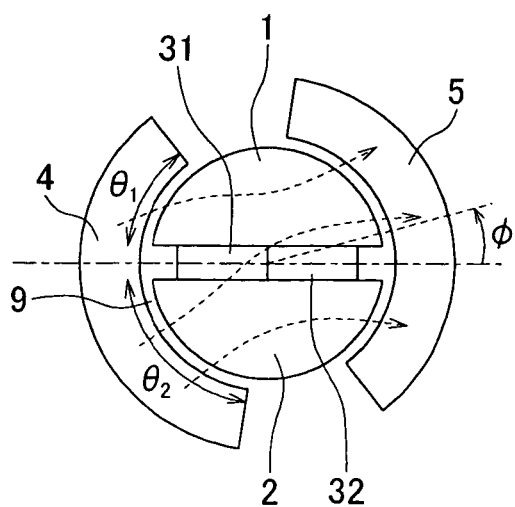
FIG. 1(c) is an explanatory view for explaining the operation principle of the rotational position sensor of the present invention.
Figure 2:
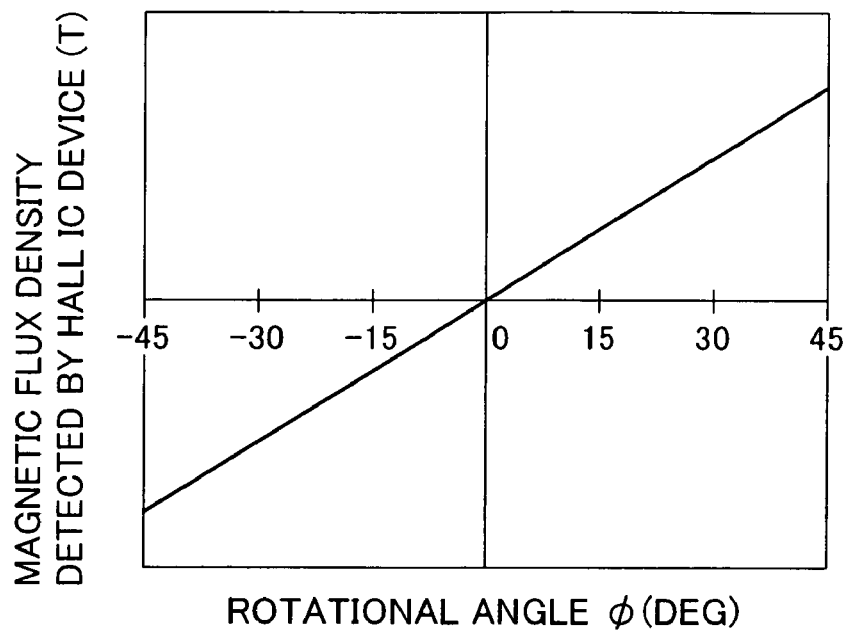
FIG. 2 is a graph showing the relationship between the rotational angle of a rotor and the magnetic flux density detected by a Hall IC in the present invention.

FIG. 1(c) is a top view showing the flows of magnetic flux in the magnet structure of this embodiment. As shown in FIG. 1(c), it is assumed that an angle including respective surfaces of the substantially half disk-shaped magnetic core 1 and the substantially arc-shaped magnetic core 4 which are opposed to each other with the air gap 9 therebetween is $\theta_1$ and an angle including respective surfaces of the substantially half disk-shaped magnetic core 2 and the substantially arc-shaped magnetic core 4 which are opposed to each other with the air gap 9 therebetween is $\theta_2$. In the case of $\theta_1 = \theta_2$, no magnetic flux passes, as a matter of course, the Hall IC's 31, 32. In the case of $\theta_1 < \theta_2$ as shown in FIG. 1(c), the magnetic flux passes the Hall IC's 31, 32 in amount substantially proportional to an angle difference $\theta_2 - \theta_1$. FIG. 2 is a graph showing the relationship between the rotational angle of the rotor and the magnetic flux density detected by the Hall IC. As seen from FIG. 2, the magnetic flux density detected by the Hall IC in the rotor represents a value proportional to the rotational angle of the rotor, and an output signal proportional to the rotational angle is obtained from the Hall IC.

Magnetic materials have varying degrees of magnetic hysteresis characteristics. Generally, when the magnetic flux density exceeds 0.5 T or 1 T, the magnetic hysteresis effect becomes more significant. To realize high accuracy in detection of the rotational position by the rotational position sensor, it is desired that the sensor be operated with the magnetic hysteresis held in a range as small as possible. For that reason, the magnetic flux density in the magnetic materials, i.e., the magnetic flux density typically in each of the substantially half disk-shaped magnetic cores 1, 2, the substantially arc-shaped magnetic cores 4, 5, and the magnetic plate 8, is desirably not more than 0.5 T. Further, it is desired to employ a magnetic material having a small magnetic hysteresis, for example, Permalloy. The above-mentioned point is similarly applied to the other embodiments described later.

Figure 3:
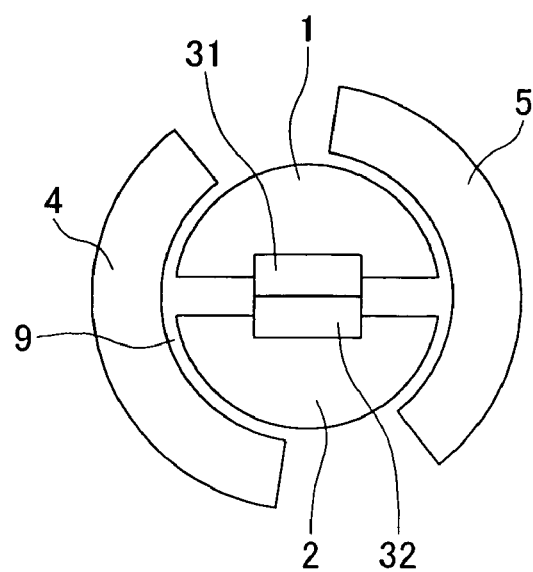
FIG. 3 is a perspective view showing a modification of the rotational position sensor according to the first embodiment of the present invention.

While, in this embodiment, the Hall IC's 31, 32 serving as magnetic sensitive devices are disposed side by side along the gap between the substantially half disk-shaped magnetic cores 1 and 2, the Hall IC's 31, 32 may be arranged in the gap between the substantially half disk-shaped magnetic cores 1 and 2 in a stacked arrangement as shown in FIG. 3. This point is also similarly applied to the other embodiments described later. Furthermore, while the permanent magnets 6, 7 used in this embodiment have a substantially arc shape, it may be substituted with instead one square magnet or a combination of two or three square magnets.

According to this embodiment, since the magnetic surfaces of the substantially half disk-shaped magnetic cores 1, 2 through which the magnetic flux flows between the substantially half disk-shaped magnetic cores 1, 2 and the substantially arc-shaped magnetic cores 4, 5 are formed by press cutting, the cut surfaces can be formed to have a very accurate shape. Therefore, the rotational position of a rotating object can be detected with high sensitivity and high accuracy within ±0.5% in a non-contact manner. Further, because of a simple structure, a noticeable advantage is obtained from the view point of reducing the size and facilitating the production process.

Second Embodiment

Figure 4:
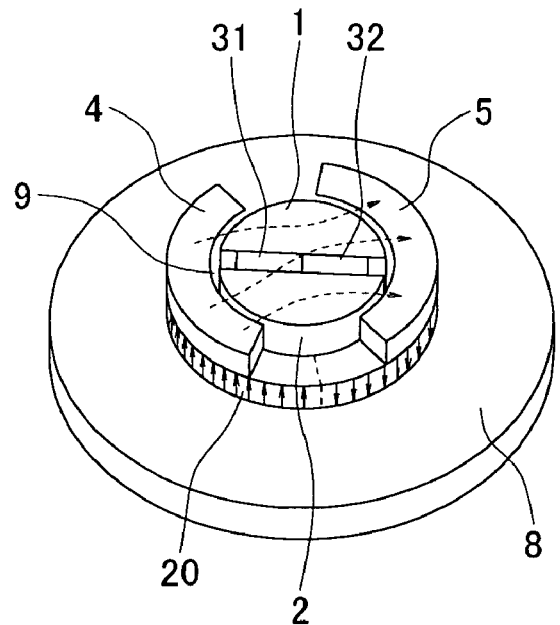
FIG. 4 is a perspective view of a rotational position sensor according to a second embodiment of the present invention.

FIG. 4 is a perspective view of a rotational position sensor according to a second embodiment of the present invention. As shown in FIG. 4, this embodiment employs a ring-shaped permanent magnet 20 instead of the substantially arc-shaped permanent magnets 6, 7. The ring-shaped permanent magnet 20 is formed into two areas each covering 180 degrees, in which their magnetization directions are opposed to each other. Such an arrangement can also provide similar functions to those in the first embodiment. Further, according to this second embodiment, as with the first embodiment, since the magnetic surfaces of the substantially half disk-shaped magnetic cores 1, 2 through which the magnetic flux flows between the substantially half disk-shaped magnetic cores 1, 2 and the substantially arc-shaped magnetic cores 4, 5 are formed by press cutting, the cut surfaces can be formed to have a very accurate shape. Therefore, the rotational position of a rotating object can be detected with high sensitivity and high accuracy. In addition, the permanent magnet used in this second embodiment can be manufactured more easily than those used in the first embodiment.

Third Embodiment

Figure 5:
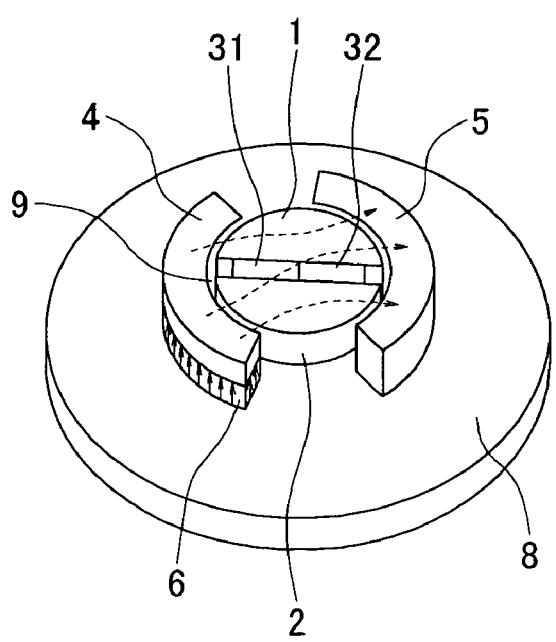
FIG. 5 is a perspective view of a rotational position sensor according to a third embodiment of the present invention.

FIG. 5 is a perspective view of a rotational position sensor according to a third embodiment of the present invention. In this embodiment, as shown in FIG. 5, only the substantially arc-shaped permanent magnet 6 is disposed under one substantially arc-shaped magnetic core 4 as in the first embodiment, while the other substantially arc-shaped magnetic core 5 is disposed at the same height as the substantially arc-shaped magnetic core 4 in the axial direction of the rotary shaft. The permanent magnet 6 is magnetized upward in FIG. 5, but it may be magnetized downward. This third embodiment can also provide similar advantages to those obtainable with the first embodiment. In addition, another advantage is that only one permanent magnet is required.

Fourth Embodiment

Figure 6A:
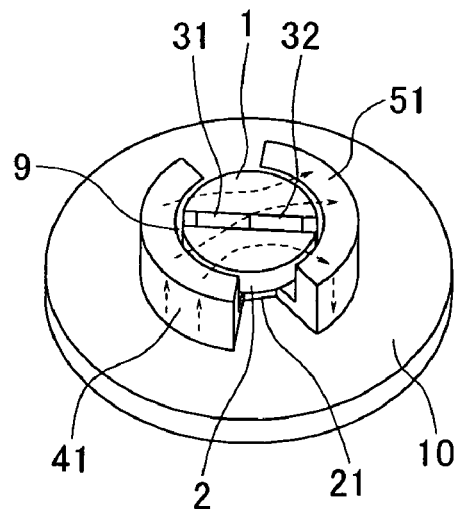
FIG. 6(a) is a perspective view of a rotational position sensor according to a fourth embodiment of the present invention.
Figure 6B:
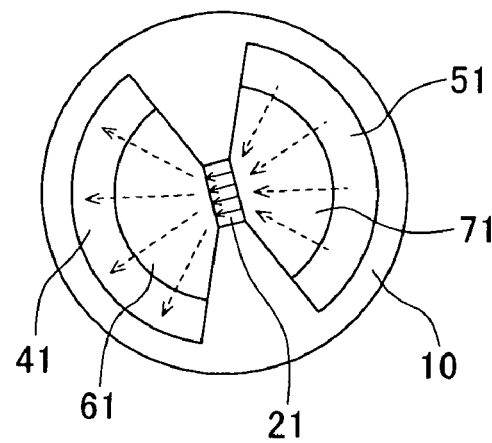
FIG. 6(b) is a top view thereof in which a stator is omitted.

FIG. 6(a) is a perspective view of a rotational position sensor according to a fourth embodiment of the present invention, and FIG. 6(b) is a top view thereof in which a stator is omitted. In this embodiment, as shown in FIGS. 6(a) and 6(b), two Hall IC's 31, 32 are disposed side by side along a gap between a pair of substantially half disk-shaped magnetic cores 1 and 2, and substantially arc-shaped magnetic cores 41, 51 are disposed around the substantially half disk-shaped magnetic cores 1, 2. A square permanent magnet 21 is joined to and between substantially arc-shaped magnetic core's extensions 61 and 71 extending from the substantially arc-shaped magnetic cores 41, 51 toward the inner peripheral side of the substantially half disk-shaped magnetic cores 1, 2. A non-magnetic plate 10 is joined to a bottom surface of the square permanent magnet 21. Spaces between the substantially half disk-shaped magnetic cores 1, 2 and the substantially arc-shaped magnetic cores 41, 51 form air gaps 9. The substantially arc-shaped magnetic cores 41, 51, the square permanent magnet 21, and the non-magnetic plate 10 are rotated as an integral unit.

In that arrangement, magnetic flux generally flows as indicated by dotted arrows in FIGS. 6(a) and 6(b). More specifically, the magnetic flux generating from the square permanent magnet 21 passes the substantially arc-shaped magnetic core 41 and then traverses the air gap 9, followed by entering, as distributed flows, the substantially half disk-shaped magnetic cores 1, 2. Parts of the distributed flows of the magnetic flux join with each other after passing the Hall IC's 31, 32. Then, the magnetic flux traverses the air gap 9 again and passes the substantially arc-shaped magnetic core 51, followed by returning to the square permanent magnet 21.

According to this fourth embodiment, since the magnetic surfaces of the substantially arc-shaped magnetic cores 41, 51 through which the magnetic flux flows between the substantially arc-shaped magnetic cores 41, 51 and the substantially half disk-shaped magnetic cores 1, 2 are formed using an accurate mold surface that is formed by press cutting, the molded surfaces can be formed to have a very accurate shape. Therefore, the rotational position of a rotating object can be detected with high sensitivity and high accuracy. Another advantage is that on one permanent magnet 21 is used and it has a square shape, the permanent magnet can be manufactured even more easily.

Fifth Embodiment

Figure 7A:
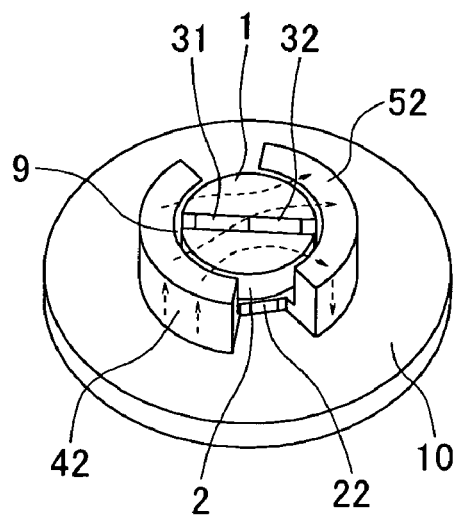
FIG. 7(a) is a perspective view of a rotational position sensor according to a fifth embodiment of the present invention.
Figure 7B:
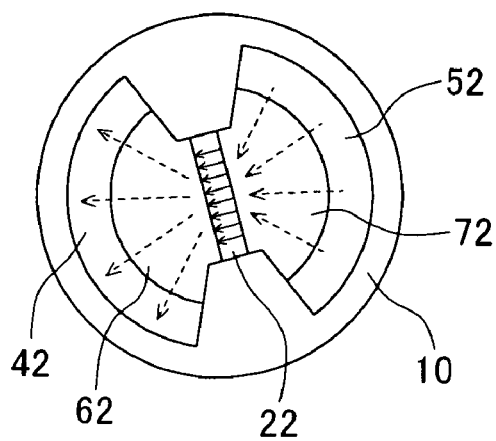
FIG. 7(b) is a top view thereof in which a stator is omitted.

FIG. 7(a) is a perspective view of a rotational position sensor according to a fifth embodiment of the present invention, and FIG. 7(b) is a top view thereof in which a stator is omitted. In this embodiment, as shown in FIGS. 7(a) and 7(b), substantially arc-shaped magnetic cores 42, 52 are disposed around the substantially half disk-shaped magnetic cores 1, 2. A square permanent magnet 22 is joined to and between substantially arc-shaped magnetic core's extensions 62 and 72 extending from the substantially arc-shaped magnetic cores 42, 52 toward the inner peripheral side of the substantially half disk-shaped magnetic cores 1, 2. A non-magnetic plate 10 is joined to a bottom surface of the square permanent magnet 22. The square permanent magnet 22 having an elongated square shape is substituted for the square permanent magnet 21 used in the fourth embodiment. The substantially arc-shaped magnetic cores 42, 52 are employed as rotor cores so that the magnetic flux generating from the square permanent magnet 22 flows through a magnetic circuit without loss. In that arrangement, the magnetic flux generally flows as indicated by dotted arrows. According to this fifth embodiment, since the magnetic surfaces of the substantially arc-shaped magnetic cores 42, 52 through which the magnetic flux flows between the substantially arc-shaped magnetic cores 42, 52 and the substantially half disk-shaped magnetic cores 1, 2 are formed using an accurate mold surface that is formed by press cutting, the molded surfaces can be formed to have a very accurate shape. Therefore, the rotational position of a rotating object can be detected with high sensitivity and high accuracy. Another advantage is that, as compared with the fourth embodiment, the amount of magnetic flux can be increased and therefore output sensitivity of the non-contact rotation position sensor can be increased correspondingly.

Sixth Embodiment

Figure 8A:
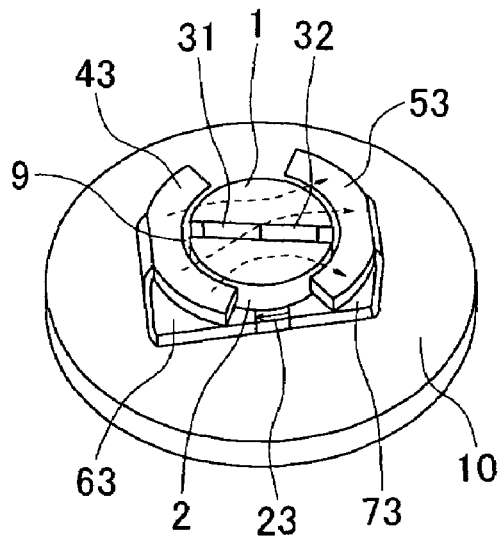
FIG. 8(a) is a perspective view of a rotational position sensor according to a sixth embodiment of the present invention.
Figure 8B:
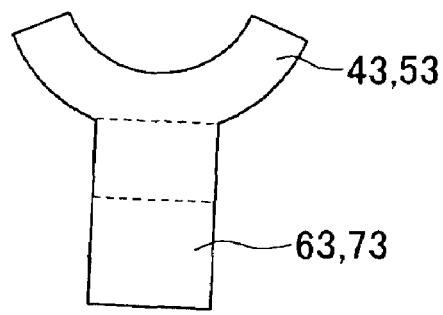
FIG. 8(b) is a top view of a substantially arc-shaped magnetic core.

FIG. 8(a) is a perspective view of a rotational position sensor according to a sixth embodiment of the present invention, and FIG. 8(b) is a top view of a substantially arc-shaped magnetic core used in the sensor before bending. In this embodiment, as shown in FIGS. 8(a) and 8(b), substantially arc-shaped magnetic cores 43, 53 have their extensions 63, 73 each having a width smaller than that of substantially arc-shaped portions thereof which are positioned to face the substantially half disk-shaped magnetic cores 1, 2. The substantially arc-shaped magnetic cores 43, 53 can be each easily manufactured by bending a magnetic plate at 90 degrees along each of dotted lines shown in FIG. 8(b), and hence mass productivity can be increased as compared with the fifth and sixth embodiments. Further, since the magnetic surfaces of the substantially arc-shaped magnetic cores 43, 53 through which the magnetic flux flows between the substantially arc-shaped magnetic cores 43, 53 and the substantially half disk-shaped magnetic cores 1, 2 are formed by press cutting, the cut surfaces can be formed to have a very accurate shape. Therefore, the rotational position of a rotating object can be detected with high sensitivity and high accuracy within ±0.5% in a non-contact manner. A permanent magnet 23 is joined to the substantially arc-shaped magnetic core's extensions 63 and 73 by an adhesive after bending them.

Seventh Embodiment

Figure 9A:
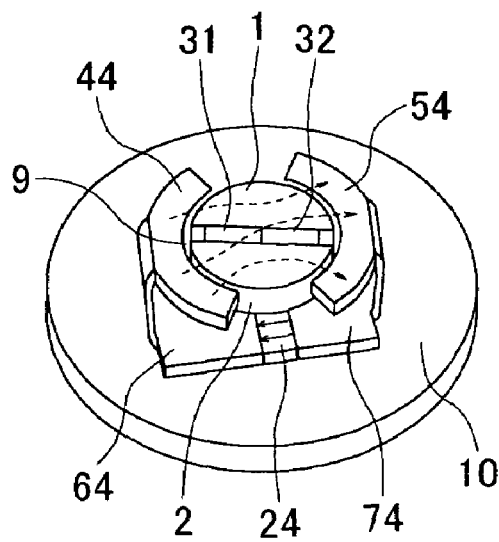
FIG. 9(a) is a perspective view of a rotational position sensor according to a seventh embodiment of the present invention.
Figure 9B:
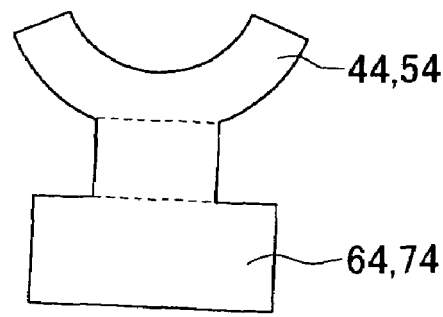
FIG. 9(b) is a top view of a substantially arc-shaped magnetic core.

FIG. 9(a) is a perspective view of a rotational position sensor according to a seventh embodiment of the present invention, and FIG. 9(b) is a top view of a substantially arc-shaped magnetic core used in the sensor before bending. This embodiment has a structure capable of employing a permanent magnet 24 longer than that in the sixth embodiment. In this seventh embodiment, substantially arc-shaped magnetic cores 44, 54 can be each easily manufactured by bending a magnetic plate, which is shown in FIG. 9(b) and partly has a shape of each of substantially arc-shaped magnetic core's extensions 64, 74, at 90 degrees along each of dotted lines shown in FIG. 9(b). Thus, according to this seventh embodiment, it is possible to increase mass productivity, the amount of magnetic flux, and output sensitivity of the non-contact rotational position sensor as compared with the sixth embodiment. A permanent magnet 24 is joined to the substantially arc-shaped magnetic core's extensions 64 and 74 by an adhesive after bending them.

Eighth Embodiment

Figure 10A:
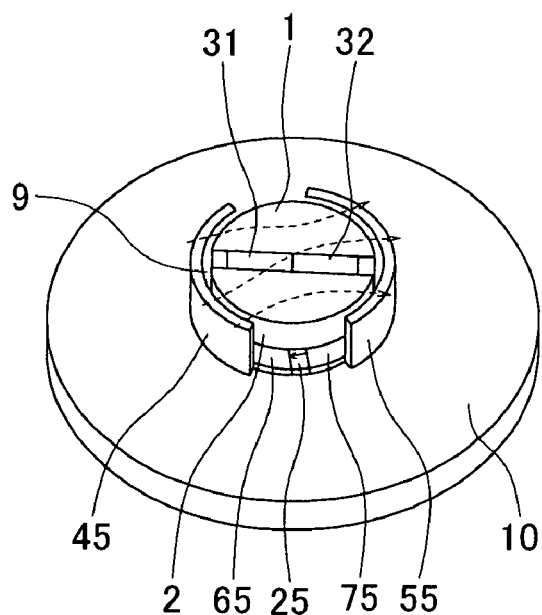
FIG. 10(a) is a perspective view of a rotational position sensor according to an eighth embodiment of the present invention.
Figure 10B:
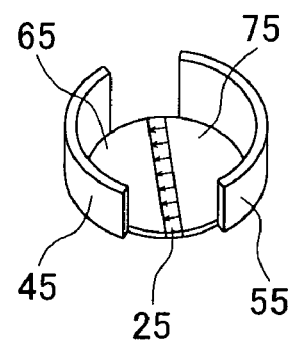
FIG. 10(b) is a perspective view of substantially arc-shaped magnetic cores.

FIG. 10(a) is a perspective view of a rotational position sensor according to an eighth embodiment of the present invention, and FIG. 10(b) is a perspective view of substantially arc-shaped magnetic cores used in the sensor. In this embodiment, two Hall IC's 31, 32 are disposed side by side along a gap between a pair of substantially half disk-shaped magnetic cores 1 and 2, and substantially arc-shaped magnetic cores 45, 55 are disposed around the substantially half disk-shaped magnetic cores 1, 2. Substantially arc-shaped magnetic core's extensions 65, 75 each made of a substantially semicircular magnetic plate are joined to bottom surfaces of the substantially arc-shaped magnetic cores 45, 55 with one square permanent magnet 25 disposed between the extensions 65, 75. A non-magnet plate 10 is joined to bottom surfaces of the substantially arc-shaped magnetic core's extensions 65, 75 and the square permanent magnet 25. The substantially half disk-shaped magnetic cores 1, 2 and the Hall IC's 31, 32 constitute a stator and are fixed to an upper portion of an associated device. Spaces between the substantially arc-shaped magnetic cores 45, 55 and the substantially half disk-shaped magnetic cores 1, 2 form air gaps 9. The substantially arc-shaped magnetic cores 45, 55, the square permanent magnet 25, and the non-magnetic plate 10 are rotated as an integral unit. According to this eighth embodiment, it is possible to increase mass productivity, the amount of magnetic flux, and output sensitivity of the non-contact rotational position sensor as compared with the seventh embodiment. Further, since the magnetic surfaces of the substantially arc-shaped magnetic cores 45, 55 through which the magnetic flux flows between the substantially arc-shaped magnetic cores 45, 55 and the substantially half disk-shaped magnetic cores 1, 2 are formed using an accurate mold surface that is formed by press cutting, the molded surfaces can be formed to have a very accurate shape. Therefore, the rotational position of a rotating object can be detected with high sensitivity and high accuracy.

Ninth Embodiment

Figure 11:
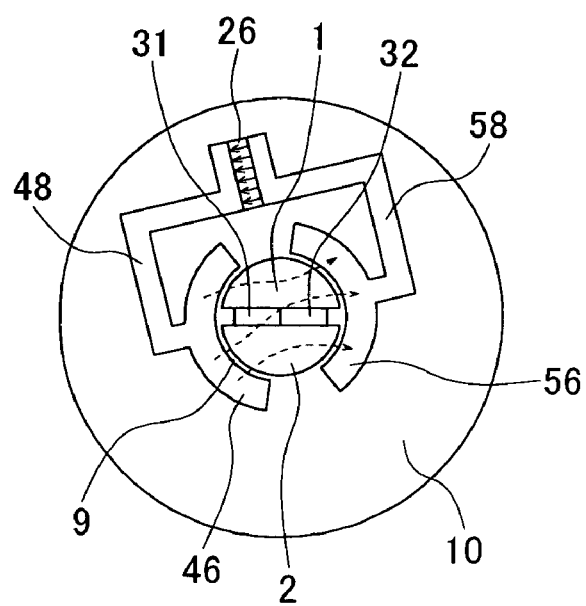
FIG. 11 is a top view of a rotational position sensor according to a ninth embodiment of the present invention.

FIG. 11 is a top view of a rotational position sensor according to a ninth embodiment of the present invention. The rotational position sensor of this embodiment has a two-dimensional flat structure. In this embodiment, two Hall IC's 31, 32 are disposed side by side along a gap between a pair of substantially half disk-shaped magnetic cores 1 and 2, and substantially arc-shaped magnetic cores 46, 56 are disposed around the substantially half disk-shaped magnetic cores 1, 2. One square permanent magnet 26 is disposed between opposed ends of extensions 48, 58 extending respectively from the substantially arc-shaped magnetic cores 46, 56, and a non-magnet plate 10 is joined to bottom surfaces of the substantially arc-shaped magnetic core's extensions 48, 58. The substantially half disk-shaped magnetic cores 1, 2 and the Hall IC's 31, 32 constitute a stator and are fixed to an upper portion of an associated device. Spaces between the substantially arc-shaped magnetic cores 46, 56 and the substantially half disk-shaped magnetic cores 1, 2 form air gaps 9. The substantially arc-shaped magnetic cores 46, 56, the square permanent magnet 26, and the non-magnetic plate 10 are rotated as an integral unit. According to this ninth embodiment, since the sensor thickness can be reduced and the shape of the permanent magnet can be more flexibly selected as compared with the above-described embodiments, it is possible to increase the amount of magnetic flux and output sensitivity of the non-contact rotational position sensor. Further, since the magnetic surfaces of the substantially arc-shaped magnetic cores 46, 56 through which the magnetic flux flows between the substantially arc-shaped magnetic cores 46, 56 and the substantially half disk-shaped magnetic cores 1, 2 are formed by press cutting, the cut surfaces can be formed to have a very accurate shape. Therefore, the rotational position of a rotating object can be detected with high sensitivity and high accuracy within +0.5% in a non-contact manner.

Tenth Embodiment

Figure 12:
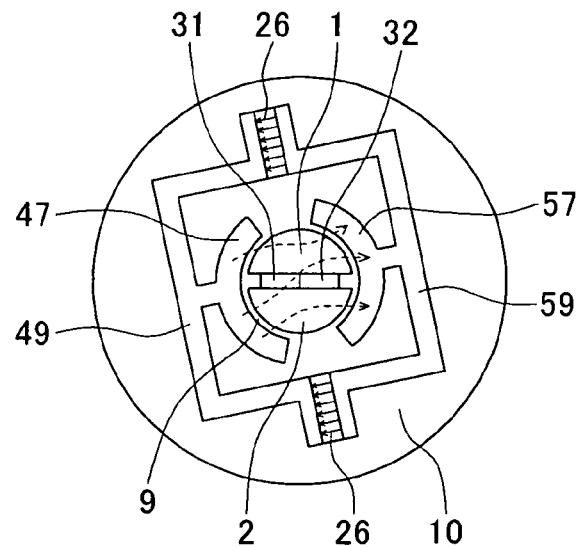
FIG. 12 is a perspective view of a rotational position sensor according to an eleventh embodiment of the present invention.

FIG. 12 is a top view of a rotational position sensor according to a tenth embodiment of the present invention. Substantially arc-shaped magnetic cores 47, 57 are disposed on both sides of substantially half disk-shaped magnetic cores 1, 2 and are formed to have extensions 49, 59 extending respectively from the substantially arc-shaped magnetic cores 47, 57 and branched in opposite directions in a surrounding relation to them. Two square permanent magnets 26 are disposed between opposed branched ends of the substantially arc-shaped magnetic core's extensions 49, 59 as shown and are magnetized in the same direction so as to intensify magnetic flux. Such an arrangement provides an advantage that output sensitivity of the non-contact rotational position sensor can be increased as compared with the ninth embodiment. Further, since the magnetic surfaces of the substantially arc-shaped magnetic cores 47, 57 through which the magnetic flux flows between the substantially arc-shaped magnetic cores 47, 57 and the substantially half disk-shaped magnetic cores 1, 2 are formed by press cutting, the cut surfaces can be formed to have a very accurate shape. Therefore, the rotational position of a rotating object can be detected with high sensitivity and high accuracy as in the embodiments described above.

Eleventh Embodiment

Figure 13:
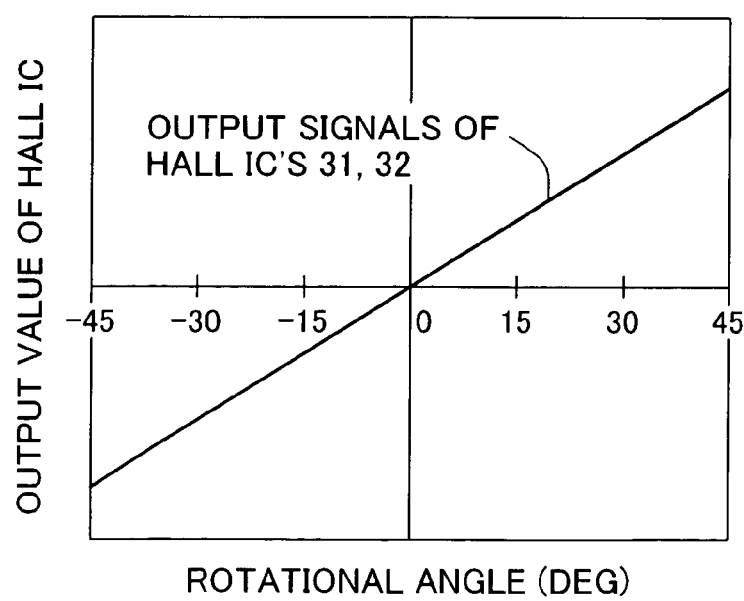
FIG. 13 is a graph showing the relationship between the output value of two Hall IC's and the rotational angle in the present invention.
Figure 14:
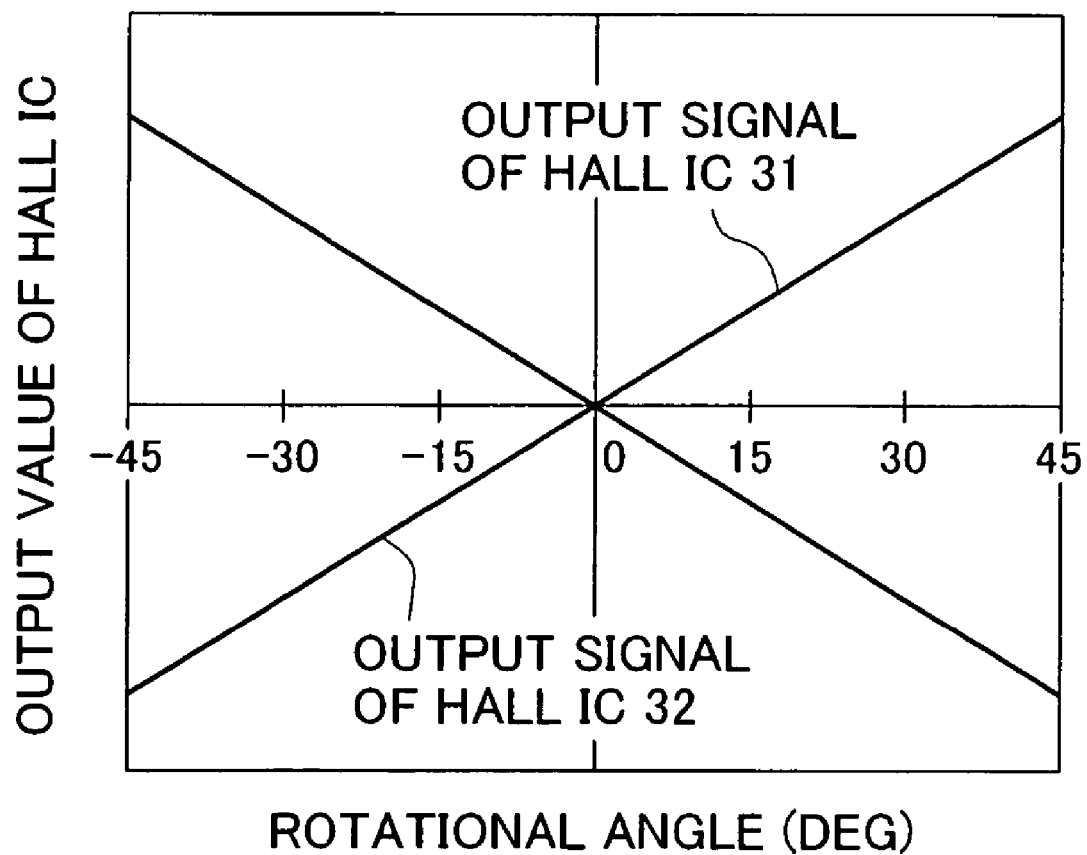
FIG. 14 is a graph showing the relationship between the output values of two Hall IC's and the rotational angle in the present invention.

The Hall IC's 31, 32 used in the non-contact rotational position sensors shown in the above-described first to tenth embodiments are grouped into two output types. Of FIGS. 13 and 14 showing the relationship between the rotational angle and the Hall IC output value, FIG. 13 represents one output type providing a characteristic A (in-phase output) in which the Hall IC's 31, 32 output the same signal, and FIG. 14 represents the other output type providing a characteristic B (cross output) in which the Hall IC's 31, 32 output signals in a reversed relation. The characteristic A shown in FIG. 13 is obtained by designing the Hall IC's 31, 32 in an operating mode of the same direction, and the characteristic B shown in FIG. 14 is obtained by deigning the Hall IC's 31, 32 in operating modes of opposed directions.

Further, a method of obtaining the characteristic B shown in FIG. 14 can be realized in two ways. With the first method, the Hall IC's 31, 32 are mounted to orient in opposed directions to each other, and the magnetic flux is guided to enter the Hall IC's 31, 32 in opposed directions to each other. With the second method, the Hall IC's 31, 32 are mounted to orient in the same direction, and an output of one Hall IC is amplified as a positive signal, whereas an output of the other Hall IC is amplified after being converted into a negative signal. This embodiment has an advantage that the signal outputs from the Hall IC's 31, 32 can be used in various ways to be adapted for a wider range of applications.

In this embodiment, the substantially half disk-shaped magnetic cores 1, 2 and the Hall IC's 31, 32 are constructed as an integral unit to serve as a rotor, and the substantially arc-shaped magnetic cores and the permanent magnet are constructed as an integral unit to serve as a stator. However, it is a matter of course that even when the substantially half disk-shaped magnetic cores 1, 2 and the Hall IC's 31, 32 are constructed as an integral unit to serve as a stator, and the substantially arc-shaped magnetic cores and the permanent magnet are constructed as an integral unit to serve as a rotor, a non-contact rotational position sensor can also operate with similar functions to those of the above-described sensors.

Twelfth Embodiment

Figure 15:
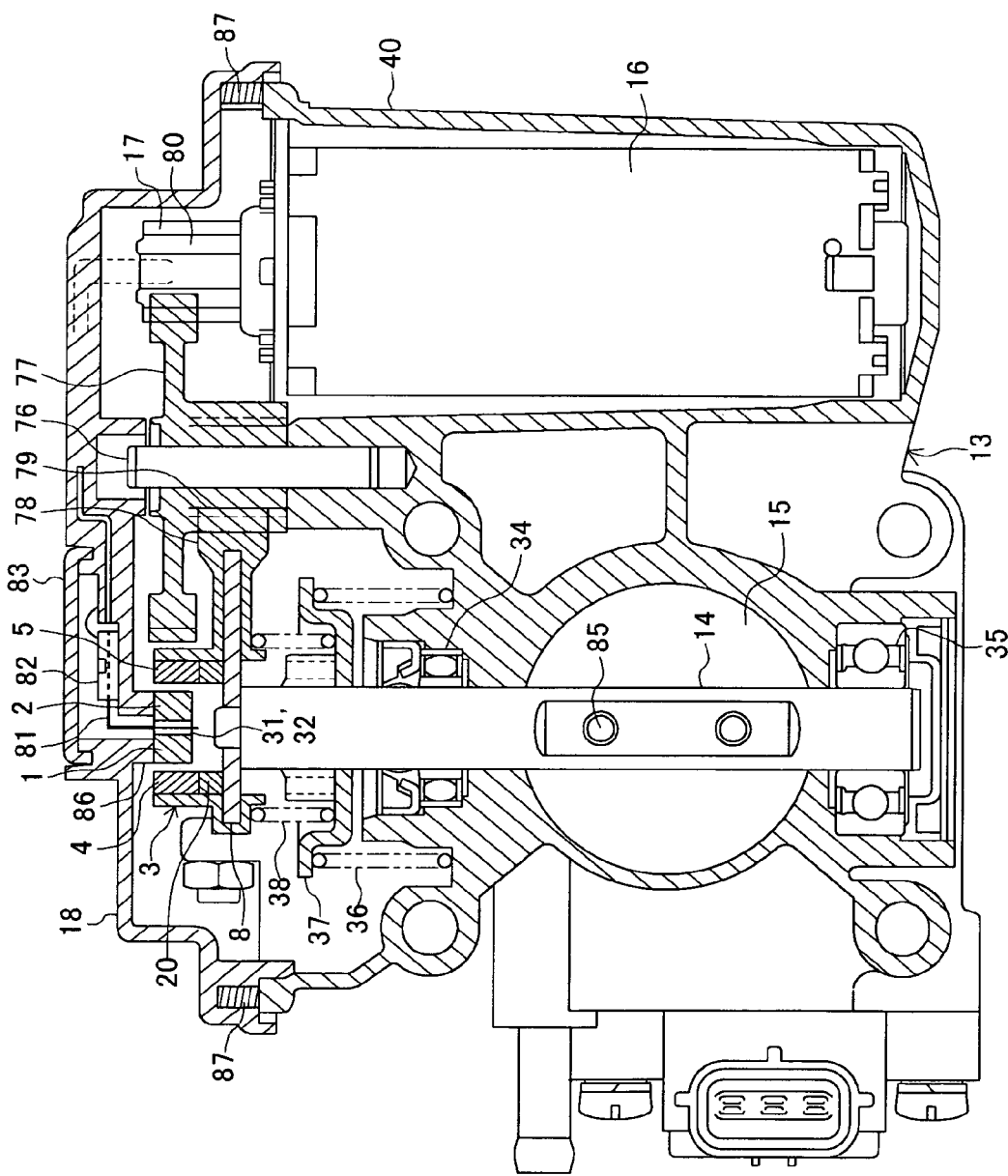
FIG. 15 is a sectional view of an electronically controlled throttle device for an internal combustion engine, which employs the non-contact rotational position sensor of the present invention.
Figure 16:
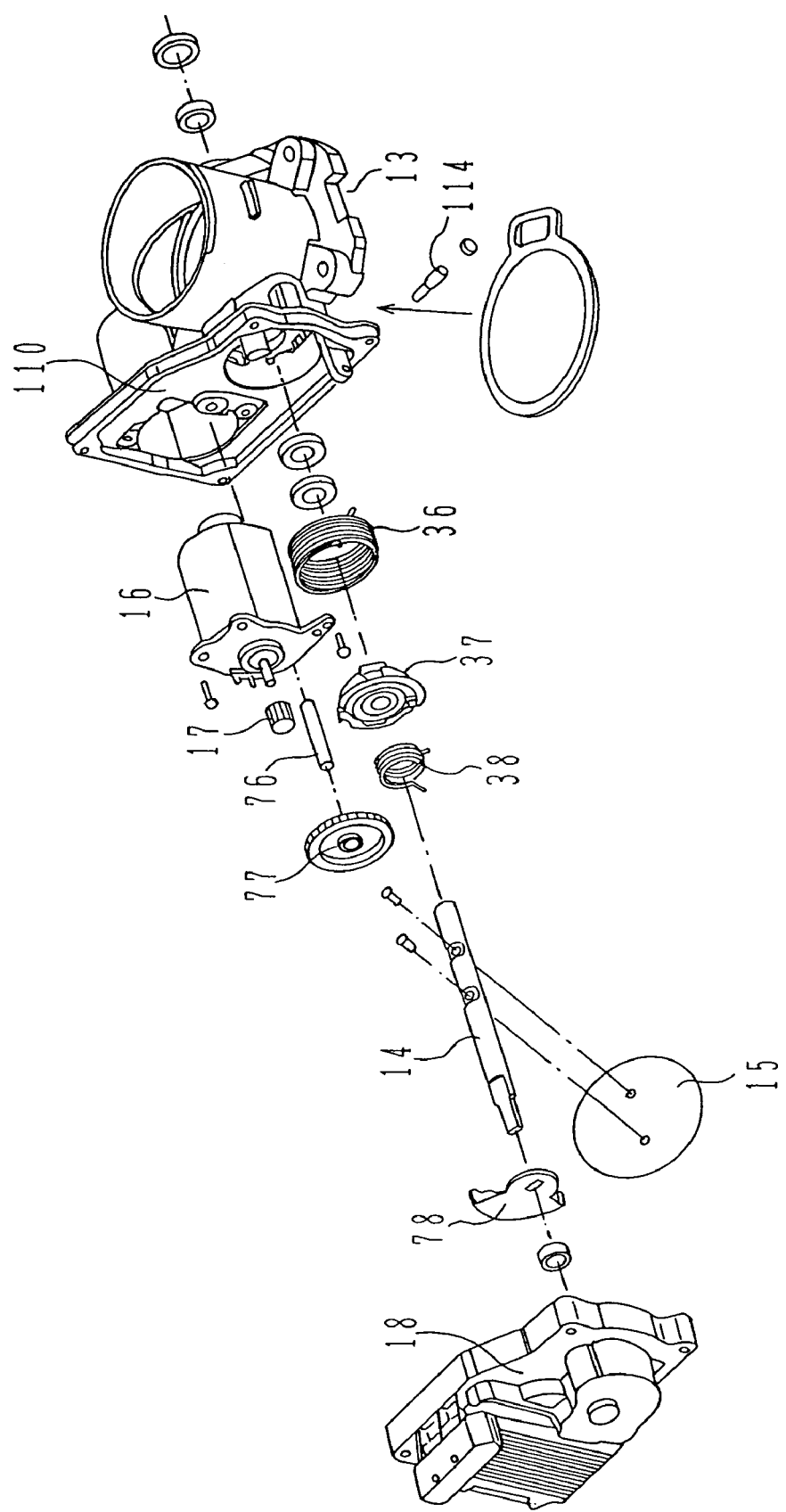
FIG. 16 is an exploded perspective view of the throttle device shown in FIG. 15.

FIG. 15 is a sectional view of an electronically controlled throttle device for an internal combustion engine, which employs the non-contact rotational position sensor of the present invention, and FIG. 16 is an exploded perspective view of the throttle device shown in FIG. 15. The electronically controlled throttle device mainly comprises a throttle body 13 as a main body, a throttle valve 15, a motor 16 serving as an electric actuator for driving the throttle valve 15, a power transmission made up of a plurality of gears, a non-contact rotational position sensor 3 mounted to a throttle valve shaft 14 and measuring an opening angle (opening degree) of the throttle valve 15, and a cover 18 for protecting the throttle valve 15, the motor 16 and the power transmission. Other main components are an electronic control module, an air flowmeter, etc. The power transmission is made up of gears 17, 77, 78 and 79. The non-contact rotational position sensor 3 used in this twelfth embodiment is the same as that described above in the second embodiment.

The throttle body 13 is formed by aluminum die casting as an integral unit comprising a section for accommodating the throttle valve 15 (i.e., a throttle chamber) and a motor housing 40 as a section for accommodating the motor 16. The throttle valve 15 is disposed in an inner space (air passage) of the throttle body 13, and the throttle valve shaft 14 is supported by bearings 34, 35 disposed in the throttle body 13 with one end of the throttle valve shaft 14 projecting externally of the throttle body. A default opening setting mechanism comprising a spring A 36, a lever 37, and a spring B 38 is provided over the one end of the throttle valve shaft 14 projecting externally of the throttle body 13. The default opening setting mechanism is constructed such that, when supply of electric power to the motor 16 is cut off, the throttle valve 15 is rotated by the spring A 36 or the spring B 38 back to the position of a default stopper so as to keep the air passage in a slightly opened state without completely shutting off it, and a rotor of the non-contact rotational position sensor 3 is rotated so as to output a signal indicating the default position to an associated device.

The motor 16 is driven in response to an accelerator signal regarding the step-down amount of an accelerator pedal and a traction control signal, and the torque of the motor 16 is transmitted to the throttle valve shaft 14 through the power transmission described above.

The gear 79 mounted to the throttle valve shaft 14 is a sector gear that is fixed to the throttle valve shaft 14 and is engaged through the spring B 38 in a mutually attracting relation with the lever 37 freely fitted over the throttle valve shaft 14. The spring A 36 serves as a spring for returning the throttle valve 15, and has one end secured to a spring locking portion provided in the throttle body 13 and the other free end engaging with the lever 37.

The default opening setting mechanism has the function of holding the initial opening degree of the throttle valve 15 to a value larger than that corresponding to the fully closed position thereof when an engine key is turned off (i.e., when no electric power is supplied to the electric actuator 16). In a range from the default opening position to the fully open position, the opening degree of the throttle valve is determined by balance between the motor torque and the force of the spring B 38 (return spring). When trying to control the opening degree of the throttle valve to a value smaller than the default one, the movement of the lever 37 is restricted by a default opening stopper, and hence such control is performed by rotating only the gear 78 and the throttle valve shaft 14 against the force of the spring B 38. Numeral 114 denotes a fully closing stopper against which one side of the sector gear 78 abuts, thereby to determine the fully closed position of the throttle valve.

For the purpose of protecting various throttle valve related components (hereinafter referred to as a "throttle valve mechanism"), such as the throttle valve shaft 14, the gear 78 including a speed reducing gear mechanism, and the motor 16, the cover 18 is attached in a covering relation to a throttle-valve mechanism accommodating section 110 that is formed in a side wall of the throttle body 13. In other words, the motor (throttle valve driver) 16 and the gear 78 are arranged such that they are protected by one cover 18. Looking at the motor 16, an opening to receive the motor housing 40 (i.e., a motor mounting opening) is formed in the throttle-valve mechanism accommodating section 110, and the motor 16 is mounted into the opening with its end bracket fixed to the section 110 by screws.

The motor 16 is driven in response to an accelerator signal regarding the step-down amount of an accelerator pedal and a traction control signal, and the torque of the motor 16 is transmitted to the throttle valve shaft 14 through the gears 17, 77 and 78. The motor 16 is accommodated in the motor housing 40. The axial direction of the motor 16 is aligned with the direction of the throttle valve shaft 14, and the gear 17 is fitted over a motor shaft 80.

A gear shaft 76 extending in the same direction as the throttle valve shaft 14 is mounted in the throttle body 13, and the gear 77 is rotatably supported by the gear shaft 76. The gear 79 is formed in a lower portion of the gear 77. The gear 78 is disposed above the lever 37 and is attached to an upper end of the throttle valve shaft 14. The gears 17 and 77 mesh with each other and the gears 78 and 79 mesh with each other as shown, thereby constituting the power transmission. With the power transmission thus constituted, the throttle valve 15 can be operated to open and close in a speed reduced state while the motor 16 is used as a driving source.

Thus, the power transmission for transmitting the output of the motor 16 to the throttle valve 15 is assembled integrally with the throttle body 13. The throttle valve 15, the motor 16, and the cover 18 for protecting the power transmission are integrally molded using a resin. In this embodiment, a module housing for accommodating an electronic control module, which controls opening and closing of the throttle valve 15, is also molded integrally with the cover 18. Further, a housing for accommodating the non-contact rotational position sensor 3 mounted to a distal end of the throttle valve shaft 14 and a gear shaft housing for accommodating a distal end of the gear shaft 76 are molded integrally with the cover 18.

A hot wire flowmeter is installed as the air flowmeter in a flowmeter housing, and a thermometer is also installed. The thermometer and the air flowmeter are installed to locate in the air passage through respective mount holes formed in the throttle body 13. Furthermore, an air introducing passage led to a pressure gauge is formed in the throttle body 13 and is communicated with an air introducing passage formed in the flowmeter housing so that the pressure in the air passage is measured by the pressure gauge disposed in the electronic control module. With such an arrangement, since the flowmeter is integrated with the electronic control module, it is possible to eliminate the need of adjustment of the flowmeter output through a learning process using a microcomputer.

Figure 17:
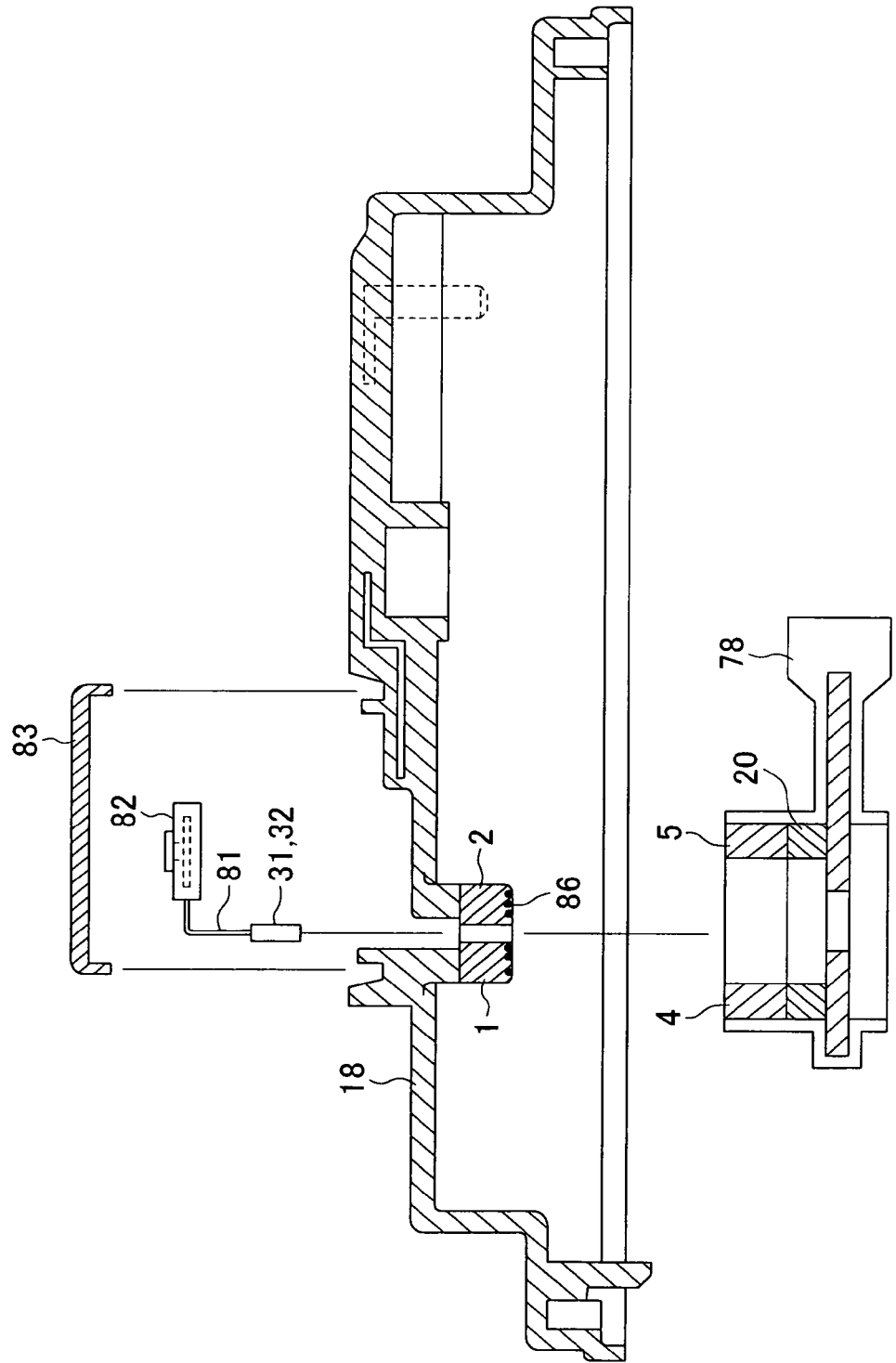
FIG. 17 is a sectional view of the non-contact rotational position sensor and a cover to which the sensor is attached.
Figure 18:
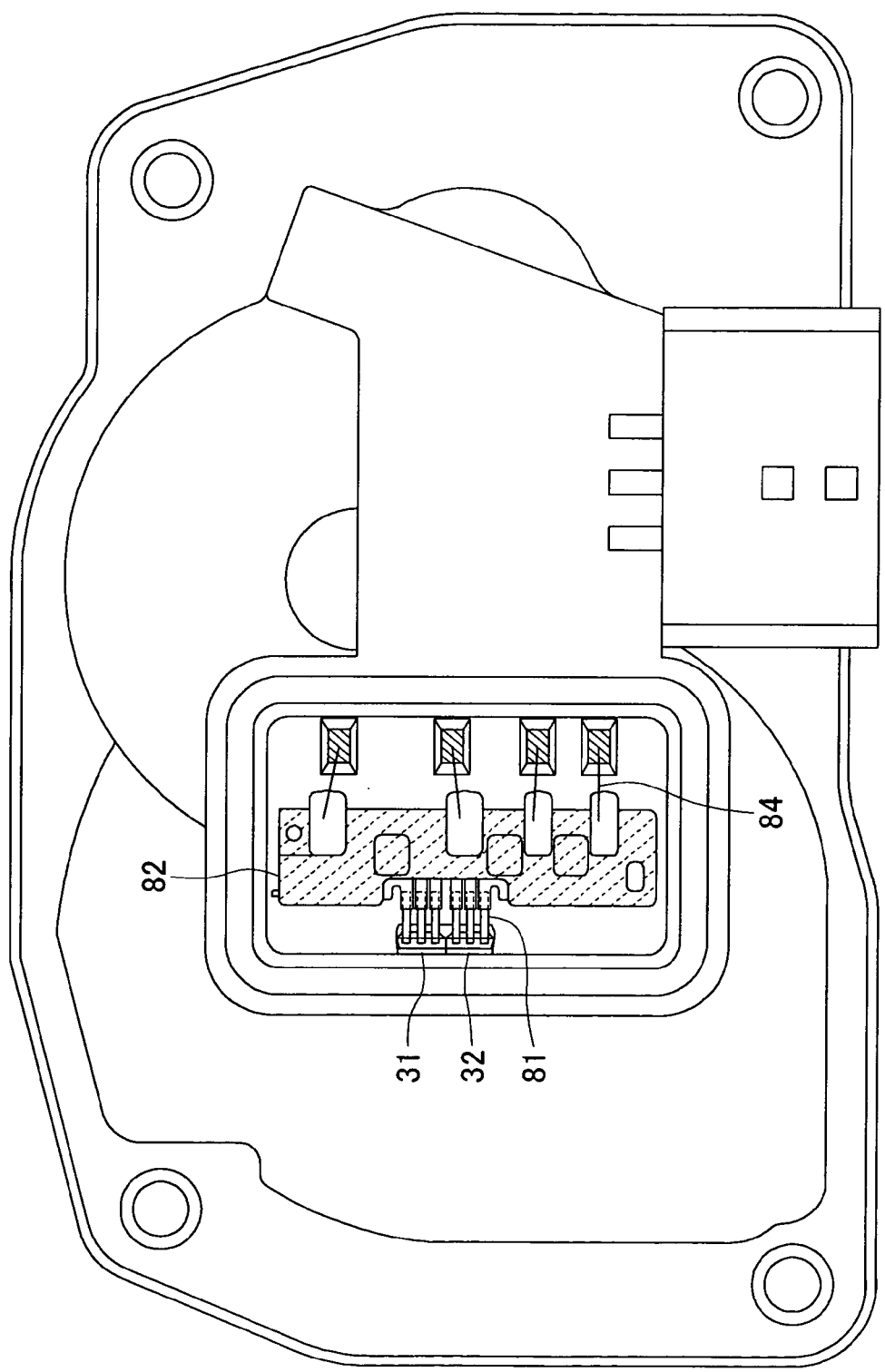
FIG. 18 is a top view of the sensor and the cover shown in FIG. 17.

FIG. 17 is a sectional view of a non-contact rotational position sensor and the cover to which the sensor is attached, and FIG. 18 is a top view of the sensor and the cover. The non-contact rotational position sensor is the same as that described above in the second embodiment. The throttle valve shaft 14 is rotatably supported by the throttle body 13. Within the throttle body 13, the throttle valve 15 for controlling an opening area of the air passage is fixed to the throttle valve shaft 14 by screws 85 (see FIG. 15). The substantially half disk-shaped magnetic cores 1, 2 are disposed on both sides of the Hall IC's 31, 32 and are placed, as the stator, in a case 86 that is made of a non-magnetic metal and fixed to the cover 18. The case 86 is resin-molded integrally with the cover 18. The Hall IC's 31, 32 are interposed between the substantially half disk-shaped magnetic cores 1 and 2, and are connected to external terminals successively via lead wires 81, a capacitor built-in transfer molding 82, and aluminum wires 84 in this order. A sealing cover 83 is attached as shown and sealed off by using an adhesive. The cover 18 is fixed to the throttle body 13 by screws with a sealing rubber 87 interposed between them.

On the other hand, the magnetic plate 8 is joined to the throttle valve shaft 14, and the ring-shaped permanent magnet 20 and the substantially arc-shaped magnetic cores 4, 5 are joined in a structure stacked in that order on the magnetic plate 8 corresponding to the outer peripheral side of the substantially half disk-shaped magnetic cores 1, 2. The gear 78 is resin-molded integrally with an outer periphery of the magnetic plate 8 by transfer molding.

With the arrangement described above, the non-contact rotational position sensor 3 can be formed at the end of the throttle valve shaft 14. According to this embodiment, since the motor 16 is mounted to the throttle body 13 and the torque of the motor 16 is transmitted to the throttle valve shaft 14 through the gear 77 and the gear 78 fixed to the throttle valve shaft 14, the amount of air required for combustion can be accurately adjusted.

Additionally, this embodiment is similarly adaptable for the case in which any of the non-contact rotational position sensors according to the first and third to tenth embodiments is employed in the electronically controlled throttle device for the internal combustion engine. In any case, the amount of air required for combustion can be accurately adjusted.

What is claimed is:

1. A rotational position sensor comprising:
   a pair of substantially half disk-shaped magnetic cores disposed in an opposed relation to each other with a magnetic sensitive device interposed therebetween;
   a pair of substantially arc-shaped magnetic cores rotatably disposed in an opposed relation to each other along semicircular outer peripheries of said half disk-shaped magnetic cores;
   a permanent magnet fixed in contact with at least one of said arc-shaped magnetic cores; and
   a non-magnetic plate for fixedly holding said arc-shaped magnetic cores and said permanent magnet,
   wherein said permanent magnet is magnetized substantially in a direction perpendicular to contact surfaces of said arc-shaped magnetic cores, said half disk-shaped magnetic cores or said permanent magnet is rotatable, and said magnetic sensitive device detects an amount of the magnetic flux varying with rotation of said half disk-shaped magnetic cores or said permanent magnet.

2. A rotational position sensor according to claim 1, wherein said permanent magnet is disposed in contact with said pair of arc-shaped magnetic cores.

3. A rotational position sensor according to claim 1, wherein said permanent magnet is disposed in contact with respective extensions of said arc-shaped magnetic cores, said extensions being disposed on the inner peripheral side of said half disk-shaped magnetic cores.

4. A rotational position sensor according to claim 1, wherein said permanent magnet is disposed in contact with respective extensions of said arc-shaped magnetic cores, said extensions being disposed around said half disk-shaped magnetic cores in a symmetrical relation.

5. A rotational position sensor according to claim 4, wherein said permanent magnet is disposed in contact with each pair of respective extensions of said arc-shaped magnetic cores, said extensions being disposed around said half disk-shaped magnetic cores in a symmetrical relation on both opposite sides of said half disk-shaped magnetic cores.

6. A rotational position sensor according to claim 1, wherein said permanent magnet and said arc-shaped magnetic cores are integrally joined to each other by a non-magnetic material.

7. A rotational position sensor according to claim 1, wherein said magnetic sensitive device is a Hall device or a Hall IC.

8. An electronically controlled throttle device for an internal combustion engine, said throttle device comprising:
   a main body having an air intake port;
   a rotary shaft disposed in said air intake port of said main body;
   a throttle valve fixed to said rotary shaft and adjusting an intake amount of air taken into said air intake port; and
   a rotational position sensor, according to claim 1, for detecting a rotational angle of said rotary shaft.

9. A rotational position sensor comprising:
   a pair of substantially half disk-shaped magnetic cores disposed in an opposed relation to each other with a magnetic sensitive device interposed therebetween;
   a pair of substantially arc-shaped magnetic cores disposed in an opposed relation to each other along outer peripheries of said half disk-shaped magnetic cores;
   a permanent magnet fixed in contact with at least one of said arc-shaped magnetic cores; and
   a magnetic plate on which said permanent magnet is fixed, and said pair of substantially arc-shaped magnetic cores are fixed on said permanent magnet, and whereby a magnetic flux generating part are consisted by said permanent magnet is sandwiched between said magnetic plate and said pair of substantially arc-shaped magnetic cores, wherein said permanent magnet is magnetized as a polarity of one face which faced to said magnetic plate and another face which faced to said pair of substantially arc-shaped magnetic cores are different, magnetic flux generating from said permanent magnet flows successively through one of said arc-shaped magnetic cores, said half disk-shaped magnetic cores, and the other of said arc-shaped magnetic cores, followed by returning to said permanent magnet, said half disk-shaped magnetic cores and said permanent magnet are relatively rotatable, said magnetic sensitive device is configured to detect an amount of the magnetic flux varying with rotation of said half disk-shaped magnetic cores or said permanent magnet, a flow of magnetic flux which has constant strength and constant direction is supplied between said pair of substantially arc-shaped magnetic cores, and a rotational position is detected by a position of said magnetic sensitive device in a rotational direction to said magnetic flux, wherein said magnetic sensitive device is positioned in said flow of said magnetic flux.

10. A rotational position sensor according to claim 9, further comprising two magnetic sensitive devices disposed between said half disk-shaped magnetic cores in a side-by-side or stacked arrangement.

11. A rotational position sensor according to claim 9, wherein said magnetic sensitive device is a Hall device or a Hall IC.

12. A rotational position sensor according to claim 9, wherein a stator including said substantially half disk-shaped magnetic cores and said magnetic sensitive device is resin-molded as an integral unit.

13. An electronically controlled throttle device for an internal combustion engine, said throttle device comprising:
 a main body having an air intake port;
 a rotary shaft disposed in said air intake port of said main body;
 a throttle valve fixed to said rotary shaft and adjusting an intake amount of air taken into said air intake port; and
 a rotational position sensor, according to claim 9, for detecting a rotational angle of said rotary shaft.

* * * * *